Jan. 24, 1956     C. PRATT     2,732,087
BALED HAY LOADER FOR TRUCKS
Filed Oct. 24, 1952
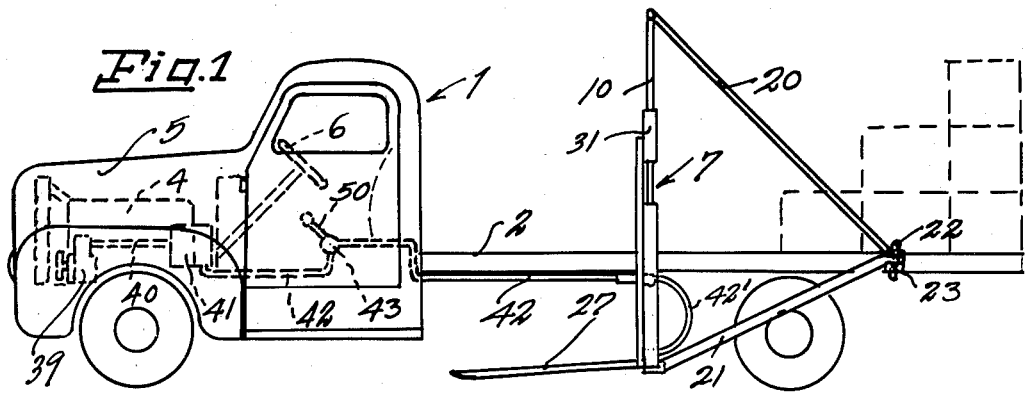
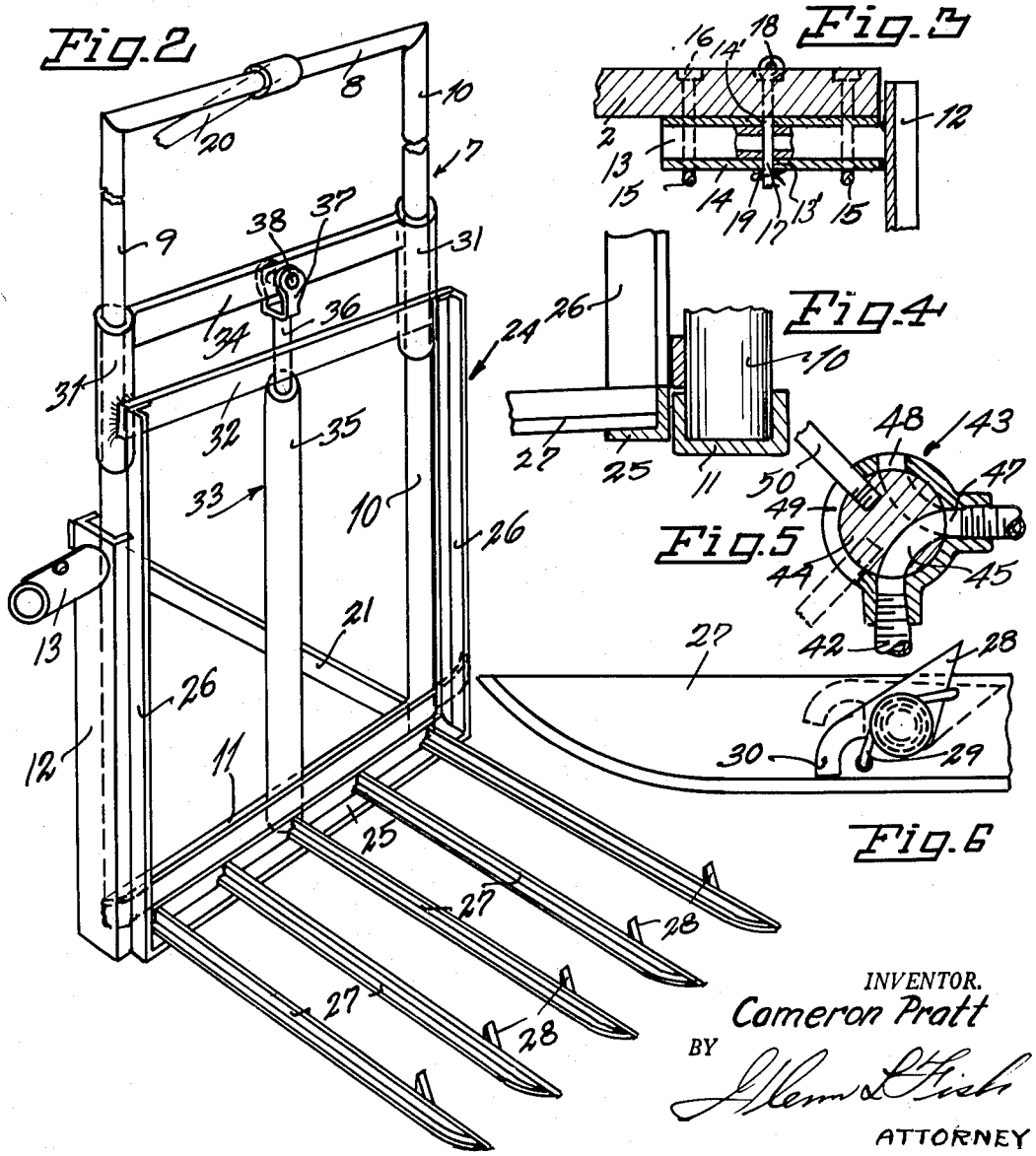
INVENTOR.
Cameron Pratt
BY
ATTORNEY United States Patent Office 2,732,087
Patented Jan. 24, 1956

2,732,087
BALED HAY LOADER FOR TRUCKS
Cameron Pratt, Rockford, Wash.
Application October 24, 1952, Serial No. 316,578
1 Claim. (Cl. 214—75)

This invention relates to a loader adapted to be mounted upon upon a truck having a flat bed and by means of which bales of hay may be lifted from a field to a position in which they may be stacked upon the flat bed of the truck.

It is one object of the invention to provide a loader which may be easily mounted upon a truck at one side thereof and disposed in such position that as the truck is driven forwardly tines of a fork or lifter will engage under a bale resting upon the ground and raise the bale to a position somewhat above the level of the truck bed when an elevator, of which the fork forms a part, is shifted upwardly.

Another object of the invention is to provide a loader having a tine-carrying frame and a track structure along which the frame or elevator moves, the track structure being adapted to be very easily attached to the truck bed and supported in a vertical position in which it projects laterally from the truck and thus allows the truck to be driven forwardly along a side of a bale of hay to be loaded upon the truck.

Another object of the invention is to provide a loader wherein the elevator is lifted by action of a fluid operated jack having air, liquid, or other fluid under pressure delivered to it from a compressor driven by the engine of the truck and flow of air to the jack being under control of the operator of the truck.

Another object of the invention is to provide a loader which is readily attachable to and detachable from a truck so that the truck may be used for highway travel after receiving each load.

Another object of the invention is to provide a bale loader which is of light weight but very strong and not liable to be damaged by rough usage.

The invention is illustrated in the accompanying drawings wherein:

Figure 1 is a side elevation showing the improved baler mounted upon a truck.

Figure 2 is a perspective view of the loader removed from the truck.

Figure 3 is a fragmentary sectional view upon an enlarged scale showing the manner in which the loader is connected with the truck bed.

Figure 4 is a fragmentary sectional view taken along the line 4—4 of Figure 2.

Figure 5 is a sectional view upon an enlarged scale of the valve by means of which the truck operator controls raising and lowering of the elevator of the loader.

Figure 6 is a fragmentary view showing a portion of one tine in side elevation.

This improved loader is adapted for use in connection with a motor truck 1 which has a bed 2 extending rearwardly from the cab 3 occupied by the operator of the truck. The usual engine 4 is under the hood 5 in front of the cab and there is also the usual steering wheel 6 and other equipment provided upon a truck. The bed 2 is flat throughout its length and width and may be of any dimensions desired.

The loader is mounted at one side of the truck and is preferably located at the side where the operator sits so that while driving the truck the operator may readily see the loader and so manipulate the truck that a bale of hay resting upon the ground will be picked up and raised to a position in which it may be removed from the loader by a stacker standing upon the bed and stacked by him, as indicated by dotted lines in Figure 1.

The loader has a vertically disposed frame or mounting structure 7 which is formed of stiff metal bent to form a cross bar or bridge portion 8 from which extend downwardly extending arms 9 and 10 having their lower ends connected by a cross bar 11. A bar 12 of channel metal extends vertically along the side bar 9 and this bar carries a laterally projecting shank 13 which is fitted into a tube 14. The tube is mounted under a side edge portion of the bed 2 and is secured by U-bolts 15 which straddle the tube and have their legs extending through openings in the bed. When the nuts 16 are applied to the U-bolts the tube will be tightly gripped and firmly held in place. Openings are formed vertically through the tube 14 and the shank 13 to receive a pin 17 having an eye 18 at its upper end so that it may be readily inserted into or withdrawn from the aligned openings 13' and 14' and in order to hold the pin in place its lower end is formed with a transverse opening to receive a cotter key 19. An upper brace 20 extends from the top of the frame 7 and a lower brace 21 extends from the outer end of the lower cross bar of this frame and these braces extend rearwardly from the frame and are secured by a bolt 22 to a bracket 23 carried by and projecting laterally from the truck bed. Since the braces are secured by a removable bolt and the shank 13 is also removably secured the loader may be easily removed from the truck when not needed and easily and quickly applied when it is to be used.

The lifter or elevator of the loader is carried by the mounting structure and has a backing 24 formed from a bar of angle metal which is bent to form a bridge 25 and upstanding legs or arms 26. Tines 27 project forwardly from the bridge 25 to which they are welded. These tines are formed of angle metal and have their horizontal flanges along their lower edges, the free end portions of the tines being curved upwardly, as shown in Figures 2 and 6 so that the tines may move forwardly along the ground and readily pass under a bale of hay resting upon the ground. Dogs 28 are pivoted to the tines against side faces of their upwardly presented flanges and each is yieldably held in a raised position by a spring 29. When the tines are moved forwardly under a bale of hay the dogs are tilted rearwardly and downwardly so that movement of the tines under the bale will not be interfered with and after the bale has passed across the dogs the springs will return the dogs to their normal position where they prevent the bale of hay from slipping forwardly off of the tines. Each dog has a forwardly projecting heel 30 which engages the horizontal flange of the tine and prevents the dog from being tilted upwardly and forwardly beyond the position shown in Figure 6.

The fork or elevator is to be shifted vertically to a raised position and back to its normally lowered position. In order to do so there have been provided sleeves 31 which slidably fit about the bars 9 and 10 of the mounting structure and have lower portions welded to ends of a cross bar 32 having its ends welded to upper ends of the side arms or legs 26 of the backing member 24 of the fork. A pneumatic jack 33 is disposed vertically under the cross bar 34 extending between upper ends of the sleeves 31 and has its cylinder 35 secured at its lower end to the cross bar 11 of the mounting member. The piston rod 36 projects from the upper end of the cylinder and at its upper end carries a clevis 37 which straddles the bar 34 and is secured thereto by a pin 38. When fluid enters the lower end of the cylinder and the piston rod is forced upwardly, the form will be raised and then the fluid is allowed to escape, the weight of the fork will cause it to return to its normally lowered position.

Air or other fluid under pressure is supplied from a compressor 39 driven from the engine 5 and passes through a pipe 40 to a tank 41. From this tank extends a pipe 42 which communicates with the lower portion of the cylinder 35 and intermediate the length of this pipe is interposed a valve 43 of the two-way type. A portion 42' of the pipe line 42 may be a flexible tube so that this portion which curves downwardly from the truck bed will not be broken when the truck is moving across rough ground. The rotatable plug 44 of the valve is formed with an arcuate opening or passage 45 of such dimensions that it may establish communication between the side ports of the valve when the plug is in the position shown in Figure 5 or connect the port 47 with the port 4 when the plug is turned to the position indicated by dotted lines in this figure. A slot 49 is formed in the valve casing circumferentially thereof and through this slot passes a lever handle 50 which extends to a position in which it may be readily grasped by the truck driver and thrust forwardly or rearwardly to adjust the valve. After the truck driver has driven the truck forwardly to a position in which the tines of the fork engage under a bale of hay the valve plug is moved from a neutral position to the position shown in Figure 5 and air under pressure enters the cylinder under the piston and the piston rod is shifted upwardly to raise the fork. The fork is brought to a stop in its raised position when its tines are substantially level with the truck bed 2 by returning the valve plug to its neutral position and a stacker on the truck will move the bale from the fork and add it to bales already stacked upon the truck. After the bale has been removed from the fork the valve plug is turned to the position indicated by dotted lines in Figure 5 and the fork will return to its lowered position ready to lift another bale from the ground. When the stacker is no longer needed it is merely necessary to detach the hose 42' and remove the fork and its mounting frame or structure from the truck.

Having thus described the invention, what is claimed is:

In a combination with a motor truck having a bed, a bale loader comprising a vertically disposed mounting frame having tubular side bars and upper and lower cross bars; a shank extending laterally from one side bar and formed with an opening intermediate its length; a tubular member mounted upon the truck bed at one side thereof said shank fitting into said tubular member and having its opening registering with an opening in the tubular member; a removable fastener extending through the registering opening and releasably securing the shank therein; an elevator having a back provided with vertical side bars and upper and lower cross bars; vertical sleeves carried by the ends of the upper cross bar and slideably fitting about the tubular side bars of said frame; bale pick-up tines projecting forwardly from the last named lower cross bar at a slight downward angle; weight depressible dogs on said tines for restricting movement of bales forwardly therefrom; a jack having a cylinder mounted vertically on said frame at its lower end and a piston rod extending upwardly from the upper end of the cylinder and at its upper end connected to said elevator; manually controlled fluid pressure means operably associated with said jack for selectively controlling the flow of fluid under pressure to the cylinder, to effect vertical movements of said tines; and braces secured to the frame at its upper and lower ends and extending rearwardly at angles to a common point remote from said tubular member and releasably fixed to said truck bed.

References Cited in the file of this patent

UNITED STATES PATENTS

| | | |
|---|---|---|
| 817,370 | Heckart | Apr. 10, 1906 |
| 1,314,569 | Burgess | Sept. 2, 1919 |
| 1,322,773 | Ewing | Nov. 25, 1919 |
| 1,345,069 | Burgess | June 29, 1920 |
| 1,682,352 | Shanks | Aug. 28, 1928 |
| 2,313,514 | Brooks | Mar. 9, 1943 |
| 2,427,301 | Puim | Sept. 9, 1947 |
| 2,431,877 | Mays | Dec. 2, 1947 |
| 2,501,112 | Webster | Mar. 21, 1950 |
| 2,540,569 | Crise | Feb. 6, 1951 |
| 2,653,678 | Lehrman | Sept. 29, 1953 |
| 2,656,058 | Foote | Oct. 20, 1953 |

FOREIGN PATENTS

| | | |
|---|---|---|
| 615,281 | Great Britain | Jan. 4, 1949 |